United States Patent [19]

Ito et al.

[11] Patent Number: 4,540,733
[45] Date of Patent: Sep. 10, 1985

[54] ANTICORROSIVE METAL SURFACE PRETREATING COMPOSITION

[75] Inventors: Takeyasu Ito, Chiba; Teruaki Kuwajima, Osaka, both of Japan

[73] Assignee: Nippon Paint Co. LTD., Japan

[21] Appl. No.: 601,845

[22] Filed: Apr. 19, 1984

[30] Foreign Application Priority Data

Apr. 19, 1983 [JP] Japan ................................. 58-69676

[51] Int. Cl.$^3$ ............................................... C08K 3/08
[52] U.S. Cl. ......................................................... 524/407
[58] Field of Search ........................ 524/413, 398, 407

[56] References Cited

U.S. PATENT DOCUMENTS 3,935,035  1/1976  Tanaka ................................. 524/407
4,457,790  7/1984  Lindert ................................ 524/413

Primary Examiner—Paul R. Michl
Attorney, Agent, or Firm—Wenderoth, Lind & Ponack

[57] ABSTRACT

An anticorrosive metal surface pretreating composition comprising:

(a) an emulsion of polymer particles comprising at least one $\alpha,\beta$-ethylenically unsaturated monomers, bearing thereon, as protective colloid, an oligomer with hydrophylic groups comprising at least one $\alpha,\beta$-ethylenically unsaturated monomer, the mean diameter of the particles being 0.1 to 3$\mu$ and the particles being formed as hard microparticles through internal gelation or having a glass transition point from 15° to 110° C., and (b) a water soluble chromium compound, 25 to 50% by weight of the total chromium contained being of trivalent, the weight ratio of said emulsion solid to metallic chromium being 1:10~5:1. The present composition affords a pretreatment coating with improved anticorrosive, bending and scratch resistant properties on various metallic substrates.

5 Claims, No Drawings 4,540,733

ANTICORROSIVE METAL SURFACE PRETREATING COMPOSITION

FIELD OF INVENTION

The present invention relates to a metal surface pretreating composition for painting and more specifically, to a metal surface pretreating composition capable of resulting in a pretreatment coating with improved anticorrosive, bending and scratch resistant properties, comprising an aqueous emulsion of polymer particles composed of α,β-ethylenically unsaturated monomers formed as hard microparticles with inner gelation or particular glass transition point and bearing thereon, as a protective colloid, a particular oligomer, and a water soluble chromium compound, the defined % of whose total chromium is trivalent.

BACKGROUND OF THE INVENTION

Various surface pretreatments have been practiced with metallic substrates such as iron, zinc plated steel, aluminium and others, to improve the corrosion resistance and coating adhesion thereof. Among the treatments proposed, particular attention is directed to, from the viewpoint of ease in operation and operational control, obviation of drain contamination, shortening of process steps and the like; and a metal surface treatment with the so-called coating type, non-rinse chromate treating agent, wherein the treating liquid containing, as main ingredients, synthetic latex and water soluble chromium compound is merely applied to the metal surface. For this end, a number of proposals have been made as, for example, Japanese Patent Application Kokai No. 57931/75, Japanese Patent Publication No. 31026/74; ibid 40865/74; ibid 1889/75 and the like. However, in heretofore proposed treating compositions, troubles have always been encountered due to the presence of surfactant or emulsifier used for the preparation of emulsion. That is, for the purpose of maintaining an emulsion in its stabilized state, employment of surfactant or emulsifier is essential but the presence of such material in the formed emulsion may inevitably cause adverse effects on adhesion, anticorrosion, water resistance of the coating prepared therefrom. Therefore, efforts have been made to solve the question of chemical stability of the emulsion without the help of the conventional type of surfactant or emulsifier and to obtain a stabilized composition comprising such emulsion and a water soluble chromium compound containing a trivalent and hexavalent Cr. In the meantime, there has been proposed a technique of using a water soluble type organic high molecular compound as an emulsifier in the preparation of resinous emulsion. That is, Japanese Patent Application Kokai No. 74934/76, describes a composition comprising a polymer emulsion and chromium compound, which is characterized in that the emulsion is prepared by using defined amounts of a particular polyacrylic acid or its ammonium salt and polymerizing α,β-ethylenically unsaturated monomers, in the presence of water soluble persulfate, at a defined temperature. Also, in Japanese Patent Publication No. 39393/81, there is disclosed a metal surface treatment with the composition comprising as principal ingredients, a polymeric emulsion, a water soluble chromium compound and a water insoluble white carbon, the emulsion being prepared by emulsion polymerization of α,β-monoethylenically unsaturated monomers using, as emulsifier, a specified amount of polyacrylic acid and/or acrylic copolymer. The thus obtained emulsion per se, i.e. the emulsion obtained by using a water soluble organic high molecular compound as an emulsifier, is quite stable chemically and can give a stabilized composition when compounded with chromium compound containing trivalent and hexavalent chromium and the resulting composition is very useful as a metal surface pretreating composition capable of forming a pretreatment film with excellent corrosion resistance and adhesion properties. However, in considering a surface pretreatment of metallic substrate, it is of great importance to take into account, besides the stationary adhesion between the substrate and the composition, the coating adhesion under bending and processing conditions, as well as the scratch resistance of the coating. Generally speaking, the properties of film adhesion under bending condition and of scratch resistance conflict with each other. In the aforesaid Japanese Patent Application Kokai No. 74934/76, attention is only directed to the adhesion under processing condition and not at all to the scratch resistance. And, in Japanese Patent Publication No. 39393/81, the claimed effects are merely of the interaction of the disclosed three components, i.e. emulsion, water soluble chromium compound and water insoluble white carbon, and no statements are given as to the scratch resistance and bending behavior in the two component system as in the present invention. Furthermore, even in the said three component system, the effects of scratch resistance and bending resistance fluctuate considerably and it was found that good results were not always obtained therewith. Especially, a low temperature bending will often cause troublesome adhesion failure and there is a trend that the greater the content of the trivalent chromium compound, the lesser the storage stability of the liquid concentrate.

The inventors, have made studies for the purpose of obtaining a metal surface treating composition comprising as main ingredients, an emulsion and chromium compound, the emulsion per se being stable irrespective of containing no surfactant and capable of giving a stabilized composition with chromium compound, which is excellent in storage stability in its concentrated form and which can result in a film with excellent anticorrosive and water resistant properties and moreover, which has improved scratch resistance and well balanced bending properties at a room temperature and a lower temperature. They have found an anticorrosive metal surface pretreating composition having improved bending and scratch resistant properties, comprising as essential components an aqueous emulsion of hard polymer microparticles obtained by emulsion polymerization of α,β-ethylenically unsaturated monomers, using as an emulsifier, polyacrylic acid and/or copolymer of acrylic acid with at least one member selected from the group consisting of methacrylic acid, acrylamides, methacrylamides and hydrophilic monomers of the formula:

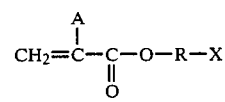

in which A stands for a hydrogen atom or a methyl group, R represents a substituted or unsubstituted alkylene having 2 to 4 carbon atoms, and X is a functional group containing at least one of oxygen, phosphorous and sulfur atoms, in an amount, on the solid basis, of 5 to 100 parts by weight per 100 parts by weight of said monomers, the polymer microparticles having a mean diameter of 0.1 to 3μ and being hardened by using as a part of said α,β-ethylenically unsaturated monomers, either monomer having in its molecule two or more ethylenic unsaturation bonds capable of entering into a radical polymerization, thereby causing inner geletion of the polymer, or appropriate monomers capable of bringing the glass transition temperature of the polymer to 15°~110° C., and a water soluble chromium compound, 30 to 50% by weight of whose chromium are trivalent, the weight ratio of emulsion solid to metal chromium being 2:1 to 5:1. On the basis of said finding, the inventors have applied for a patent (Japanese Patent Application No. 92663/82).

The abovesaid invention had been made, starting from the theoretical considerations such that since a metal surface is full of microscopic undulations if a device is made on the resinous microparticles so as to have a mean diameter that is small enough to be set into the depressed portions of said undulations and to be of a considerably hard nature, then the resistance to shear stress will be increased, which must be of use in stress relaxation in the vicinity of said particles. Thus, the said invention intends to provide a non-rinse coating type chromate treating composition capable of resulting in a coating with excellent anticorrosive, bending and scratch resistant properties and the like. However, such metal surface treating composition is generally applied onto a metal substrate whose surface has already been treated with zinc phosphate or the like. Therefore, at the time when the said composition is applied by a conventional means as spraying, dipping or roll coating, there is often observed a phenomenon in which an amount of metal ions from the undercoat is accumulated in the treating composition by the recycle of a part of the coating liquid and if the employed composition is based on an emulsion containing polyacrylic acid or the like, thus accumulated metal ions and said polyacrylic acid react with each other, thereby forming the corresponding salt and causing an increase in viscosity or inner gelation of the treating composition. Therefore, it would be an inmeasurable advancement of the technical level in the relevant industry to provide a metal surface pretreating composition comprising as main ingredients, an aqueous emulsion and chromium compound, which is stable without the inclusion of surfactant and capable of resulting in a coating with excellent bending and coin-scratch resistant properties, and containing no materials such as acrylic copolymer which may cause, through reaction with metal ions, an increase in viscosity or inner gelation of the composition. The present invention has been made to solve the abovesaid problems.

SUMMARY OF THE INVENTION

According to the invention, is provided an anticorrosive metal surface treating composition comprising as essential components (A) an aqueous emulsion of polymer particles comprising at least one α,β-ethylenically unsaturated monomer, having as protective colloid, an oligomer with hydrophylic groups comprising at least one ethylenically unsaturated monomer, and being formed as hard microparticles with a mean diameter of 0.1~3μ, internally gelated or possess in a specific glass transition temperature of 15°~110° C., and (B) a water soluble chromium compound, 25~50% by weight of the total chromium content being trivalent, the weight ratio of said emulsion (in solid) to the metallic chromium being 1:10~5:1.

DESCRIPTION OF SPECIFIC EMBODIMENTS

The term "oligomer" as used herein denotes a polymer of α,β-ethylenically unsaturated monomers having a relatively low molecular weight of up to about 10,000. In an emulsion polymerization of α,β-ethylenically unsaturated monomers in an aqueous medium, it is generally required to use a surfactant or emulsifier. However, when a high molecular weight protective colloid such as polyacrylic acid or acrylic copolymer is present in the reaction system, there is no need for using such surfactant because the said polymer with hydrophilic groups exerts the same function as that of an emulsifier. The thus formed emulsion per se is very stable and can give a stabilized composition when compounded with a chromium compound. These findings were utilized as the basis of the invention of Japanese Patent Application No. 92663/82.

As already stated, such polyacrylic acid or acrylic acid copolymers possess functional groups that are reactive with the metallic ions and the thus formed high molecular weight insoluble salt is the proximate cause of an increase in the viscosity and gelation of the treating composition. Therefore, even admitting the abovesaid reaction with metallic ions, if the product is a salt of an oligomer having a relatively small molecular weight, then it will give only a limited effect on the increase in viscosity of the treating composition. Moreover, if the oligomer does not include or includes only a small amount of functional groups, then the increase in viscosity would be practically avoided in such a composition. The inventors' studies were concentrated in these points and the present invention was established as the results of these workings.

The aqueous emulsion to be compounded with a water soluble chromium compound in the present invention is an emulsion of polymer particles composed of at least one α,β-ethylenically unsaturated monomer characterized by (1) having as a protective colloid an oligomer with hydrophilic groups comprising at least one α,β-ethylenically unsaturated monomer,
(2) having a mean diameter of 0.1 to 3μ, and
(3) being formed as hard microparticles with inner gelation or having a special Tg value Such emulsion may be advantageously prepared as follows. That is, at least one α,β-ethylenically unsaturated monomer is polymerized in an aqueous medium in the presence of initiator to give an oligomer with hydrophilic groups of low molecular weight, preferably of less than about 10,000. At this time, the abovesaid hydrophilic groups as, for example, carboxyl group, sulfonic acid group or the like, may be introduced from either the material of polymerization monomer or the initiator. To this aqueous oligomer solution, are added in the presence of initiator, α,β-ethylenically unsaturated monomers (a part of which is composed of monomer having 2 or more radically polymerizable unsaturation bonds in the molecule for inner gelation purposes or which are selected so as to give a polymer with a defined Tg value) and reacted according to an emulsion polymerization technique to obtain an emulsion of polymer microparticles having a mean diameter of 0.1 to 3μ.

Since the oligomer has hydrophilic groups, the oligomer is, in an aqueous reaction system, always arranged such that the hydrophilic groups are positioned outside and the hydrophobic portion inside. In the abovementioned polymerization, the oligomer takes the polymerization monomers inside in the hydrophobic portion and allows polymerization at that site. Therefore, at the outside portion of the polymer particles, there always exist such oligomer whose hydrophilic groups are oriented to the outside direction. This is the reason why the present oligomer fulfills the function of surfactant heretofore used and the formed emulsion is maintained in a stabilized state. Even if there are chances for the metallic ions to react with the oligomer, the formed salt is of considerably lower molecular weight and hence there is no increase in viscosity of the composition and this produces no gelation in the substance. Thus, in the present invention, the most characteristic feature resides in the point that employment of oligomer is effective for the control of gelation of the treating composition. Therefore, it is appreciated that depending on the application purpose, an amount of high molecular weight water soluble polymer as polyacrylic acid may be used together with said oligomer, providing that it gives no adverse effect on viscosity increase and gelation of the treating composition. The present emulsion of polymer particles may also be prepared by using a part of the thus obtained emulsion as seed material and adding $\alpha,\beta$-ethylenically unsaturated monomers to be polymerized and effecting an emulsion polymerization thereof. As already stated, the said seeds are composed of hard polymer particles having protective colloid thereupon. The monomers are selectively taken in the inner hydrophobic portion and polymerized at that position. Thus, each seed can play a similar role as the abovesaid oligomer itself. From the foregoing, it will be appreciated that comparatively small size particles may be advantageously prepared by the method of using said oligomer and comparatively large size particles by the method with the abovesaid seed material.

Examples of $\alpha,\beta$-monoethylenically unsaturated monomers to be polymerized are acrylic esters (e.g. methyl acrylate, ethyl acrylate, isopropyl acrylate, n-butyl acrylate, 2-ethylhexyl acrylate, decyl acrylate, isooctyl acrylate, 2-ethylbutyl acrylate, octyl acrylate, methoxyethyl acrylate, ethoxyethyl acrylate, 3-ethoxypropyl acrylate and the like), methacrylic esters (e.g. methyl methacrylate, ethyl methacrylate, isopropyl methacrylate, n-butyl methacrylate, iso-butyl methacrylate, n-hexyl methacrylate, lauryl methacrylate, decyloctyl methacrylate, stearyl methacrylate, 2-methylhexyl methacrylate, glycidyl methacrylate, 2-ethoxyethyl methacrylate, cetyl methacrylate, benzyl methacrylate, 3-methoxybutyl methacrylate and the like), acrylonitrile, methacrylonitrile, vinyl acetate, vinyl chloride, vinyl ketones, vinyl toluene and styrene. One or more than two of these members are used. It is also possible to add a small amount of such monomers as acrylic acid, methacrylic acid, acrylamides, methacryl amides and other hydrophilic monomers.

However, in the present invention, in order to obtain a coating with improved scratch resistance and bending resistance, the emulsion particles should be fine (average grain diameter of 0.1 to $3\mu$), hard polymer particles. Such hardening may be attained by the inclusion of internal gelation or high glass transition point in the constituting polymer.

In the case of using an internal gelation technique, use is made of, as a part of $\alpha,\beta$-ethylenically unsaturated monomers constituting the polymer particles, a polyfunctional monomer having 2 or more radically polymerizable, ethylenic unsaturation bonds in its molecule, and emulsion polymerization is effected in an usual manner.

As the polyfunctional monomers, mention is made of polymerizable, unsaturated monocarboxylic esters of polyhydric alcohols, polymerizable unsaturated alcohol esters of polycarboxylic acids and aromatic compounds substituted with more than 2 vinyl groups. Typical examples are ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethyl ethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, tri-allyl cyanurate, triallyl isocyanurate, triallyltrimellitate, diallyl terephthalate, diallylphthalate and divinyl benzene. The emulsion polymerization may be practiced under normal conditions in a conventional way, in the presence of water soluble free radical catalyst containing no alkali metal ions as ammonium persulfate and 2,2-azo-bis-(2-amidinopropane)hydrochloride, in an aqueous medium, excepting substituting the abovesaid water soluble oligomer for emulsifier.

The formation of water soluble oligomer of $\alpha,\beta$-ethylenically unsaturated monomers and the emulsion polymerization of $\alpha,\beta$-ethylenically unsaturated monomers in the presence of said oligomer may be practiced each in different reaction vessels or in the same vessel successively.

According to one preferred embodiment of the invention, said oligomer solution and the emulsion may be prepared as follows: That is, into water (preferably, deionized water) maintained at a polymerization temperature, are added dropwise and simultaneously a mixture of $\alpha,\beta$-ethylenically unsaturated monomers and polyfunctional monomer if any, and an aqueous solution of water soluble catalyst having no alkali metal ions (e.g. ammonium persulfate) each from different dropping funnel (or as mixed solution), and the mixture is maintained at the same temperature for a while as desired. To the thus obtained oligomer solution, are next added dropwise a mixture of $\alpha,\beta$-ethylenically unsaturated monomers and polyfunctional monomer if any, and an aqueous solution of water soluble catalyst having no alkali metal ions (e.g. ammonium persulfate) simultaneously each from different dropping funnel or firstly the abovesaid catalyst solution and secondly the monomer solution, and the mixture is maintained at the same temperature for a while. The polymerization is carried out under stirred condition and temperature is usually maintained at 50°~90° C. The polymerization time (dropping time plus curing time) is usually from 1 to 10 hours. In the present invention, the thus obtained emulsion particles, however, should have a mean diameter of 0.1 to 3μ. As already stated, in the formation of uneven coating, in order to obtain an improved adhesion to metal surface, it is essential that the emulsion particles be roughly distributed, in order to get into the minute depressed portions of the metal surface and be firmly adhered thereonto. The inventors have found that markedly improved adhesion can be obtained with an emulsion whose particle size is in a range of 0.1 to 3μ, and especially at around 0.5~2μ. It is generally well known that microparticle emulsion may be prepared by emulsion polymerization technique using a high speed mixing and heating means, and that the emulsion particle size may be controlled at will by adjusting the operational conditions to be used. Therefore, anyone skilled in the art may appropriately select optimum operational conditions in obtaining the abovesaid emulsion particle size.

Instead of using internally gelated polymer particles, the present object may also be attained with polymer particles having a defined glass transition temperature (Tg).

The inventors have found that if the Tg value of said polymer is in a range of 15° to 110° C., preferably 40° to 110° C., there are marked improvements in the bending resistance and scratch resistance of the thus formed coating. If the Tg is less than 15° C., the resulting coating is deficient in, among others, bending resistance and scratch resistance. On the other hand, it is generally impossible to obtain a polymer with Tg value of more than 110° C. from conventionally used $\alpha,\beta$-ethylenically unsaturated monomers. Since the Tg value of a polymer may be estimated and calculated from the kinds and amounts of the monomers to be polymerized, it would not be so difficult for the person skilled in the art to settle the glass transition point of the polymer in the abovesaid range.

Alternatively, the present emulsion microparticles may be composed of hard polymer by using, as a part of the monomers, a polyfunctional unsaturated monomer and causing an inner gelation in the respective molecule. As to the amount of said polyfunctional monomer, there is no particular limit on it, providing it gives hard polymer particles by said inner gelation, and however, for the present purpose, it is generally sufficient to be in a range of 0.01 to 20% by weight, preferably 0.1 to 10% by weight, of the total monomers used. As suggested previously, the present emulsion may also be obtained by using, in place of said oligomer, a part of the thus obtained emulsion as seed material in the subsequent polymerization.

The thus obtained emulsion is compounded with a specified amount of water soluble chromium compound to give the metal surface pretreating composition of this invention. However, in this water soluble chromium compound, the trivalent chromium content should be 25 to 50% by weight, preferably 35 to 45% by weight, of the total chromium contained. Such chromium compound may be advantageously prepared by, for example, subjecting $CrO_3$ to a partial reduction with formaline, hydrogen peroxide or the like to the desired trivalent chromium level. If the trivalent chromium content is less than 25% by weight, there is a trend that bending resistance will become deteriorated and if it is more than 50% by weight, the stability of concentrated liquid, when formulated, become delinquent.

The present metal surface pretreating composition can be prepared by mixing the abovesaid emulsion and water soluble chromium compound in water (preferably deionized water).

It is possible and most practicable to prepare the liquid concentrate with a comparatively small quantity of water for storage purpose and dilute it to an appropriate concentration with water just before the application thereof. Of course, the treating composition of this invention may be directly formulated with a comparatively larger quantity of water from the first. The compounding ratio of emulsion to water soluble chromium compound is another important factor of this invention. It is essential in the invention that the weight ratio of emulsion solid to metallic chromium be in a range of 1:10 to 5:1. The most preferable ratio is 1:1~3:1. If the metal chromium content is lower than the abovesaid range, there is a trend that the corrosion resistance be ruined and the effective adhesion between the undercoat and metal surface be lost. On the other hand, if the chromium content is in too great an excess of the abovesaid range, there will occur a question of inferior adhesion between the undercoat and the metal surface.

The present metal surface treating composition may include, as desired, silica microparticles (7~60 mμ) to the same quantity with the chromium compound to further increase the scratch resistance of the coating. Such particles may be added to the emulsion after or during the preparation step thereof.

The present metal surface treating composition may further include, as desired, various metallic ions (except alkali metal ion) or inorganic ion sources to the extent not to destroy the stabilized state of the composition. By the addition of such materials, it is possible to form on a metallic substrate a more uniform pretreating coat with far improved adhesion. Examples of such ions are $Zn^2$, $Co^2$, $Ni^2$, $Fe^2$, $PO_4^3$, $F$, $BF_4$, $DSiF_6^2$ and the like.

The present metal surface pretreating composition may be applied by using any conventional means as for example roll coating, mist spraying and dipping, to various metal substrates (e.g. iron, zinc plated steel, aluminium and the like) and then dried to form the desired undercoating thereupon. Such coating is generally applied in chromium coverage of 5 mg to 1 $g/m^2$, preferably 5 mg to 100 $mg/m^2$. If the metal content is outside the abovesaid range, there is a trend that working performance will become deteriorated. In an actual coil coating line for zinc plated steel, steel or aluminium plates, preference is given to the so-called rollcoating because a thin uniform pretreating coat can be obtained without the trouble of generation of color shading therewith. As the drying condition, only evaporation of water in the undercoating will do and in most cases, the maximum plate temperature is less than 120° C., preferably 80° to 110° C. and drying time is about 1 to 60 seconds. If it remotely departs from the above, there are instances where unfavorable results will occur in respect of adhesion of coating and especially scratch resistance thereof. The present pretreatment is excellent in corrosion resistance and water resistance because of including no surfactant in the emulsion of the pretreating composition, and furthermore, shows markedly improved adhesion properties as bending resistance and scratch resistance.

In using the present pretreating composition, there is no need for troublesome maintenance of the composition and for a consecutive mass production of the coated plates, the only requirement is the regular replenishment of the same composition. Thus, a uniform coating can be easily made and the desired pretreating coat can be obtained, after drying, consecutively. Since a rinsing and post-treatment are not required after said coating, processing steps are markedly shortened and no plants are necessitated for the treatment of contaminated waste water. The formed pretreating coat, as already stated, shows excellent film performance, especially in respect of bending resistance and scratch resistance and therefore, the present composition is very useful for the pretreatment of various metal substrates for painting. The present surface pretreating composition surpasses others in, inter alia, storage stability of the liquid concentrate and low temperature workability, which are particular characteristics of the present composition.

The invention shall be now more fully explained in the following Examples. Unless otherwise stated, all parts and % are by weight.

Preparation of emulsion:

Reference Example 1 (High Tg Emulsion EM No. 1)

Into a flask fitted with stirrer, reflux condenser, thermometer and two dropping funnels, were placed 400 parts of deionized water and the flask was heated under stirring to 80°~85° C. In one of the dropping funnels, was placed a catalyst aqueous solution obtained by dissolving 1.2 parts of ammonium persulfate in 66 parts of deionized water, and in the other funnel, a monomer mixture comprising 100 parts of methyl methacrylate, 60 parts of styrene, 20 parts of 2-hydroxyethyl methacrylate and 20 parts of n-butyl methacrylate. Into the abovesaid flask, the whole amounts of said catalyst solution and 5% of the monomer mixture were placed and the mixture was stirred for 5 minutes.

At the stage when the polymerization liquid turned turbid, the remaining amount of the monomer mixture was dropped in over 2.5 hours, and after completion of said addition, the mixture was further maintained and cured at the polymerization temperature for 2 hours to complete the reaction. A uniform, stable emulsion was obtained (solid 30.2%, pH 2.3, grain diameter $0.3\mu$, Tg 89° C.).

Reference Example 2 (internally gelated Emulsion EM No. 2)

The same procedures as stated in Reference Example 1 were repeated excepting using a monomer mixture comprising 100 parts of methyl methacrylate, 54 parts of styrene, 20 parts of 2-hydroxyethyl methacrylate, 20 parts of n-butyl methacrylate and 6 parts of ethyleneglycol dimethacrylate. A uniform, stable emulsion was obtained (solid 30.0%, pH 2.3, grain diameter $0.5\mu$). It was confirmed that the emulsion particle was insoluble in xylene.

Reference Example 3 (Internally gelated emulsion EM No. 3)

Into a similar reaction vessel as used in Reference Example 1, were weighed 320 parts of deionized water and 6 parts of emulsion obtained in Reference Example 1 and heated to 80° C. To this reaction vessel, were added, under stirring, an aqueous solution comprising 20 parts of deionized water and 0.2 part of ammonium persulfate, and subsequently a preemulsion comprising 100 parts of methyl methacrylate, 54 parts of styrene, 20 parts of 2-hydroxyethyl methacrylate, 20 parts of n-butyl methacrylate, 6 parts of ethyleneglycol dimethacrylate, 0.1 part of sodium dodecylbenzene sulfonate, 3.6 parts of ammonium persulfate and 100 parts of deionized water, over 2 hours.

After completion of said addition, stirring was continued for additional 30 minutes, and then an aqueous solution comprising 20 parts of deionized water and 0.2 part of ammonium persulfate was added and the mixture was stirred for 1 hour. The thus obtained emulsion showed solid content of 30.2%, pH of 2.3 and mean grain diameter of $1.0\mu$.

Reference Example 4 (High Tg emulsion EM No. 4 for comparison sake, prepared by using a high molecular weight water soluble polymer as emulsifier).

Into the similar reaction vessel as used in Reference Example 1, were placed 300 parts of deionized water and 240 parts of 25% aqueous solution of water soluble copolymer (MW 66000) prepared by copolymerizing acrylic acid and 2-hydroxyethyl methacrylate in weight ratio of 8:2, and the mixture was heated under stirring to 80°~85° C. To this, from one dropping funnel, a monomer mixture comprising 100 parts of methyl methacrylate, 60 parts of styrene, 20 parts of 2-hydroxyethyl methacrylate and 20 parts of n-butyl methacrylate, and from the other funnel, a catalyst solution comprising 4 parts of ammonium persulfate and 100 parts of deionized water were simultaneously added dropwise over 3 hours. After completion of said addition, the mixture was cured at 80°~85° C. for about 2 hours to complete the polymerization reaction. The thus obtained product was a uniform emulsion having a solid content of 30.1%, pH of 1.6, mean grain diameter being $0.2\mu$ and Tg being 89° C.

Reference Example 5 (Internally gelated emulsion EM No. 5 for comparison sake, prepared by using a high molecular weight water soluble polymer as emulsifier).

The same procedures as stated in Reference Example 4 were repeated excepting using a monomer mixture comprising 100 parts of methyl methacrylate, 54 parts of styrene, 20 parts of 2-hydroxyethyl methacrylate, 20 parts of n-butyl methacrylate and 6 parts of ethyleneglycol dimethacrylate. The thus obtained product was a uniform, stable emulsion having a solid content of 30.0%, pH of 1.6, the mean diameter of the polymer particles contained being $0.6\mu$. These were found to be insoluble in xylene.

EXAMPLE 1

17.6 Parts of Emulsion EM No. 1 obtained in Ref. Example 1, 30 parts of aqueous chromium solution obtained by adding 37% formaline to 17% aqueous chromic anhydride solution and reducing 38% of hexatomic chromium to trivalent chromium (metallic chromium = 30×0.17×0.52 (Cr/CrO$_3$), 26.5 parts of silica dispersion (10% dispersion of Aerosil 190 300, trade name by Nippon Aerosil Co.) and 25.9 parts of deionized water were mixed together at a room temperature to obtain a liquid concentrate. Prior to application, this was diluted with deionized water to 3.3 times by weight. The weight ratio of emulsion solid to metallic chromium was 2:1 and silica to metallic chromium was 1:1.

EXAMPLES 2~6 AND COMPARATIVE EXAMPLES 1~6

Various treating liquid concentrates and diluted treating liquids were prepared by using the emulsion EM No. 1~No. 5 obtained in Reference Examples 1~5, according to the procedures of Example 1 and following the prescriptions as given in Table 1, respectively. The weight ratio of emulsion solid to metallic chromium and of silica to metallic chromium are also shown in Table 1.

an adhesive tape was applied thereon and peeled out, and evaluated as follows:

TABLE 1

| Example | Ex. 2 | Ex. 3 | Ex. 4 | Ex. 5 | Ex. 6 | Com. 1 | Com. 2 | Com. 3 | Com. 4 | Com. 5 | Com. 6 |
|---|---|---|---|---|---|---|---|---|---|---|---|
| Emulsion | | | | | | | | | | | |
| EM No. | 2 | 1 | 2 | 3 | 2 | 4 | 1 | 1 | 5 | 1 | 1 |
| av. diam. ($\mu$) | 0.5 | 0.3 | 0.5 | 1.0 | 0.5 | 0.2 | 0.3 | 0.3 | 0.6 | 0.3 | 0.3 |
| N.V. (%) | 30.0 | 30.2 | 30.0 | 30.2 | 30.0 | 30.1 | 30.2 | 30.2 | 30.0 | 30.2 | 30.2 |
| weight parts | 8.2 | 26.0 | 23.6 | 17.6 | 2.6 | 17.6 | 26.4 | 26.4 | 17.6 | 52.8 | 0.4 |
| Chromium comp. | | | | | | | | | | | |
| $CrO_3$ % | 17 | 17 | 17 | 17 | 17 | 17 | 17 | 17 | 17 | 17 | 17 |
| reduction % | 40 | 30 | 39 | 40 | 40 | 40 | 55 | 5 | 39 | 35 | 35 |
| weight parts | 30 | 30 | 40 | 30 | 30 | 30 | 30 | 30 | 30 | 30 | 30 |
| Silica disper. | | | | | | | | | | | |
| N.V. % | — | 10 | — | 10 | 10 | 10 | — | 10 | 10 | 10 | — |
| weight parts | — | 13.3 | — | 13.3 | 26.5 | 26.5 | — | 13.3 | 13.3 | 13.3 | — |
| Deion. water | | | | | | | | | | | |
| weight parts | 61.2 | 30.7 | 36.4 | 39.1 | 40.9 | 25.9 | 43.6 | 30.3 | 39.1 | 3.9 | 69.6 |
| Em. N.V./Cr | 0.9 | 3 | 2 | 2 | 0.3 | 2 | 3 | 3 | 2 | 6 | 0.05 |
| Silica/Cr | — | 0.5 | — | 0.5 | 1 | 1 | — | 0.5 | 0.5 | 0.5 | — |
| Dilut. times | ×4.4 | ×3.8 | ×4.4 | ×3.3 | ×3.3 | ×4.4 | ×4.4 | ×3.3 | ×4.4 | ×4.4 | ×4.4 |

The following tests were carried out with these liquid concentrates and diluted treating compositions. The test results are shown in Table 2.

(1) Stability of liquid concentrate:

Stabilization of liquid concentrate was evaluated by visual observation of the state of said concentrate after being stored in a sealed polyethylene vessel at 20° C. for 1 month.

O . . . no change
Δ . . . increase in viscosity
X . . . gelation (2) Stability of diluted treating composition added with cation:

$Zn_3(PO_4)_2 4H_2O$ was added to a diluted treating composition (Cr concentration 1.5 weight %) in an amount of 7000 ppm, and viscosity of the composition was measured by using B-type viscometer (at 6R. P.M.).

O . . . less than 10 cp
X . . . more than 2000 cp (3) 2T bending test:

Molten zinc plated steel (regular spangle with no skin pass) liable to be hardly cracked when bent was used as metal substrate, to which was first applied the respective treating composition diluted with deionized water, using #3 bar coater, so as to give the defined chromium coverage and dried in a hot air furnace at 70° C. To this, was applied Superlack DIF P-75 Primer (Nippon Paint Co.) as an undercoat to give a dry thickness of $3\mu$ and baked under the condition that plate temperature came to 204° C. in 50 seconds. The thus obtained 2C/2B (two coat and two bake) coated plate was subjected to 2T bending test (20° C.), wherein the coated plate was bent, Point 5 . . . no abnormality
point 1 . . . thoroughly peeled out (4) Coin scratch test:

Similar surface treated steel plates were prepared and then Superlack DIF F-15 Beige (Nippon Paint Co.) was applied to in a dry thickness of $11\mu$ and baked at the maximum plate temperature of 210° C. for 50 seconds. Using this 1C/1B (one coat and one bake) test specimen, the coin scratch atest was carried out. That is, the coating was rubbed with unnotched coin and scratch resistance was evaluated by 5 point evaluation system from point 5 of excellent to point 1 of no good. The test results are shown in Table 2.

TABLE 2

| Example | 1 | 2 | 3 | 4 | 5 | 6 | Com. 1 | Com. 2 | Com. 3 | Com. 4 | Com. 5 | Com. 6 |
|---|---|---|---|---|---|---|---|---|---|---|---|---|
| dilut. times of liq. conc. | 3.3 | 4.4 | 3.8 | 4.4 | 3.3 | 3.3 | 4.4 | 4.4 | 3.3 | 4.4 | 4.4 | 4.4 |
| Cr coverage (mg/m²) | 40 | 30 | 35 | 40 | 40 | 40 | 30 | 30 | 40 | 30 | 30 | 30 |
| stability of liq. conc. | O | O | O | O | O | O | O | Δ | O | O | O | O |
| stability of dil. sol. added with cation | O | O | O | O | O | O | X | X | O | X | O | O |
| 2T bending test | 5 | 5 | 5 | 5 | 5 | 5 | 5 | 5 | 3 | 5 | 3 | 3 |
| coin scratch test | 4 | 3.5 | 4 | 3.5 | 4 | 4 | 3.5 | 3 | 3.5 | 4 | 3.5 | 2.5 |

What is claimed is:

1. An anticorrosive metal surface pretreating composition comprising (A) an emulsion of polymer particles comprising at least one $\alpha,\beta$-ethylenically unsaturated monomer, bearing thereon, as protective colloid, an oligomer with hydrophylic groups comprising at least one $\alpha,\beta$-ethylenically unsaturated monomer, the mean diameter of the particles being 0.1 to $3\mu$ and the particles being formed as hard microparticles through internal gelation or having a glass transition point from 15° to 110° C., and (B) a water soluble chromium compound obtained by partial reduction of $CrO_3$, 25 to 50% by weight of the total chromium content being trivalent, the weight ratio of said emulsion solid to metallic chromium being 1:10 5:1.

2. The composition according to claim 1 wherein the weight ratio of emulsion solid to metallic chromium is 3:1.

3. The composition according to claim 1 containing silica as optional component.

4. The composition according to claim 1 wherein the trivalent chromium content is 30 to 45% by weight of the total chromium.

5. The composition according to claim 1 wherein the glass transition point of the emulsion polymer is 40° to 110° C.

* * * * *

UNITED STATES PATENT AND TRADEMARK OFFICE
CERTIFICATE OF CORRECTION

PATENT NO. : 4,540,733
DATED : September 10, 1985
INVENTOR(S) : Takeyasu Ito et al.

It is certified that error appears in the above-identified patent and that said Letters Patent is hereby corrected as shown below:

Column 6, line 12, "more than 2" should be -- 2 or more --.

Signed and Sealed this

Thirteenth Day of May 1986

[SEAL]

Attest:

DONALD J. QUIGG

Attesting Officer

Commissioner of Patents and Trademarks